United States Patent
Gonze et al.

(10) Patent No.: US 8,341,945 B2
(45) Date of Patent: Jan. 1, 2013

(54) ELECTRICALLY HEATED PARTICULATE FILTER

(75) Inventors: Eugene V. Gonze, Pinckney, MI (US); Michael J. Paratore, Jr., Howell, MI (US)

(73) Assignee: GM Global Technology Operations LLC

( * ) Notice: Subject to any disclaimer, the term of this patent is extended or adjusted under 35 U.S.C. 154(b) by 523 days.

(21) Appl. No.: 12/496,009

(22) Filed: Jul. 1, 2009

(65) Prior Publication Data

US 2011/0004391 A1    Jan. 6, 2011

(51) Int. Cl.
    *F01N 3/00*    (2006.01)
(52) U.S. Cl. ............... 60/297; 60/274; 60/286; 60/303; 60/311
(58) Field of Classification Search .............. 60/274, 60/284–287, 295–301, 303
    See application file for complete search history.

(56) References Cited

U.S. PATENT DOCUMENTS

| | | | |
|---|---|---|---|
| 4,404,795 A | 9/1983 | Oishi et al. | |
| 4,404,796 A | 9/1983 | Wade | |
| 4,427,418 A | 1/1984 | Kogiso et al. | |
| 4,516,993 A | 5/1985 | Takeuchi et al. | |
| 4,549,395 A | 10/1985 | Dammann | |
| 4,549,398 A | 10/1985 | Oishi et al. | |
| 4,685,290 A * | 8/1987 | Kamiya et al. | 60/274 |
| 5,144,798 A | 9/1992 | Kojima et al. | |
| 5,171,335 A | 12/1992 | Kojima et al. | |
| 5,195,316 A | 3/1993 | Shinzawa et al. | |
| 5,207,807 A | 5/1993 | Manfre et al. | |
| 5,458,673 A | 10/1995 | Kojima et al. | |
| 5,472,462 A | 12/1995 | Pischinger et al. | |
| 5,711,149 A | 1/1998 | Araki | |
| 5,716,586 A | 2/1998 | Taniguchi | |
| 6,013,118 A | 1/2000 | Matsunuma et al. | |
| 6,090,172 A | 7/2000 | Dementhon et al. | |
| 6,167,696 B1 | 1/2001 | Maaseidvaag et al. | |
| 6,176,896 B1 | 1/2001 | Dementhon et al. | |
| 6,405,528 B1 | 6/2002 | Christen et al. | |
| 6,634,170 B2 | 10/2003 | Hiranuma et al. | |
| 6,769,246 B2 | 8/2004 | Strohmaier et al. | |
| 6,973,778 B2 | 12/2005 | Kondou et al. | |
| 7,073,326 B2 | 7/2006 | Cheong | |
| 7,111,455 B2 | 9/2006 | Okugawa et al. | |
| 7,146,804 B2 | 12/2006 | Yahata et al. | |
| 7,171,801 B2 * | 2/2007 | Verkiel et al. | 60/297 |
| 7,288,137 B2 * | 10/2007 | Iyer et al. | 95/278 |
| 7,340,887 B2 | 3/2008 | Ante et al. | |
| 7,412,822 B2 | 8/2008 | Zhan et al. | |

(Continued)

FOREIGN PATENT DOCUMENTS

CN    1535351    10/2004

(Continued)

*Primary Examiner* — Thomas Denion
*Assistant Examiner* — Jesse Bogue

(57) ABSTRACT

A control system comprises a particulate matter (PM) filter, an electric heater, a first heating module, and a second heating module. The PM filter includes M zones that filter PM from exhaust gas. The electric heater includes M segments corresponding to the M zones that heat exhaust gas input to selected ones of the M zones when activated. The first heating module activates N of the M segments to heat exhaust gas input to N of the M zones to regenerate the N zones. The second heating module operates in one of a first mode and a second mode to regenerate other ones of the M zones after the N zones are regenerated. The first mode includes adjusting an air-fuel ratio of the exhaust gas. The second mode includes activating other ones of the M segments to heat exhaust gas input to other ones of the M zones.

20 Claims, 6 Drawing Sheets

U.S. PATENT DOCUMENTS

| | | | |
|---|---|---|---|
| 7,607,295 B2 | 10/2009 | Yokoyama et al. | |
| 7,631,493 B2 | 12/2009 | Shirakawa et al. | |
| 7,685,811 B2 | 3/2010 | Taylor et al. | |
| 7,794,528 B2 | 9/2010 | Tochikawa et al. | |
| 7,886,529 B2 * | 2/2011 | Gonze et al. | 60/295 |
| 7,896,956 B2 | 3/2011 | Takase et al. | |
| 7,901,475 B2 | 3/2011 | Gonze et al. | |
| 8,037,673 B2 | 10/2011 | Gonze et al. | |
| 8,146,350 B2 | 4/2012 | Bhatia et al. | |
| 2003/0000188 A1 | 1/2003 | Harada et al. | |
| 2003/0113249 A1 | 6/2003 | Hepburn et al. | |
| 2003/0131592 A1 | 7/2003 | Saito et al. | |
| 2004/0134187 A1 | 7/2004 | Inoue et al. | |
| 2005/0072141 A1 | 4/2005 | Kitahara | |
| 2005/0198944 A1 | 9/2005 | Saitoh et al. | |
| 2006/0075731 A1 | 4/2006 | Ohno et al. | |
| 2006/0254265 A1 | 11/2006 | Odajima et al. | |
| 2007/0062181 A1 | 3/2007 | Williamson et al. | |
| 2007/0137186 A1 | 6/2007 | Igarashi | |
| 2007/0214778 A1 | 9/2007 | Narita et al. | |
| 2007/0220869 A1 | 9/2007 | Gonze et al. | |
| 2007/0220870 A1 | 9/2007 | Gonze et al. | |
| 2007/0227104 A1 | 10/2007 | Gonze et al. | |
| 2007/0245721 A1 | 10/2007 | Colignon | |
| 2008/0041035 A1 | 2/2008 | Sawada et al. | |
| 2008/0083212 A1 | 4/2008 | Ament et al. | |
| 2008/0295483 A1 | 12/2008 | Scaife et al. | |
| 2009/0064664 A1 | 3/2009 | Hirata et al. | |
| 2009/0071128 A1 | 3/2009 | Gonze et al. | |
| 2009/0113883 A1 | 5/2009 | Bhatia et al. | |
| 2009/0158715 A1 | 6/2009 | Stroh et al. | |
| 2009/0183501 A1 * | 7/2009 | Gonze et al. | 60/303 |
| 2009/0288398 A1 | 11/2009 | Perfetto et al. | |
| 2010/0095657 A1 | 4/2010 | Gonze et al. | |
| 2010/0126145 A1 | 5/2010 | He et al. | |

FOREIGN PATENT DOCUMENTS

| | | |
|---|---|---|
| CN | 1540143 A | 10/2004 |
| CN | 101091038 A | 12/2007 |
| CN | 101429884 A | 5/2009 |
| DE | 102008046706 | 4/2009 |
| DE | 102008046924 | 4/2009 |
| DE | 102008046924 A1 | 4/2009 |
| DE | 102008050169 | 5/2009 |
| GB | 2454341 A | 6/2009 |
| JP | 06-221138 | 8/1994 |

* cited by examiner

ELECTRICALLY HEATED PARTICULATE FILTER

FIELD

The present disclosure relates to engine control systems, and more particularly to electrically heated particulate filters.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Engines such as diesel engines and compression ignition engines may produce particulate matter (PM) that is filtered from exhaust gas and collected by a PM filter. The PM filter is disposed in an exhaust system of the engine. The PM filter reduces emissions of PM generated during combustion. Over time, the PM filter becomes full. During a process called regeneration, the PM may be burned within the PM filter.

Regeneration may involve heating the PM filter to a combustion temperature of the PM. Regeneration may be performed using an exhaust heating technique or using an electrical heating technique. The exhaust heating technique refers to the heating of the exhaust gas, for example, by post-combustion injection of fuel. Fuel may be injected into the cylinder during the combustion cycle and after ignition of the air/fuel mixture or into the exhaust stream. When introduced during or after ignition and/or exhaust strokes of the combustion cycle, the injected fuel, referred to as post-injected (PI) fuel, mixes with the exhaust gas and is oxidized by an oxidation catalyst disposed in the exhaust system. The heat released from the reaction in the oxidation catalyst increases the temperature of the exhaust gas flowing through the PM filter, which ignites particulates in the PM filter.

A typical exhaust heating technique may be limited to an exhaust gas temperature that permits slow, controlled burning of the PM. The typical exhaust heating technique may regenerate the PM filter in 20-30 minutes. Exhaust gas temperatures during the typical exhaust heating technique may range from approximately 550° C. to 650° C., depending on the amount of PM in the PM filter. For example only, when the exhaust gas temperature is greater than approximately 650° C. and the PM filter is full, the PM may combust too quickly and release too much heat. The heat may cause thermal stress on the PM filter due to rapid expansion of a substrate of the PM filter. The thermal stress may cause damage to the PM filter. Therefore, the exhaust gas temperature is controlled to be less than a thermal stress temperature, typically less than approximately 650° C.

The electrical heating technique refers to the electrical heating of the exhaust gas entering the PM filter. One or more electrical coils may be disposed upstream from the PM filter and may be activated to heat the exhaust gas. The electrical heating technique provides a quick heating and light-off of the PM. The electrical heating technique may also provide a more uniform and controlled combustion of the PM in the PM filter.

SUMMARY

A control system comprises a particulate matter (PM) filter, an electric heater, a first heating module, and a second heating module. The PM filter receives exhaust gas of an engine and filters PM from the exhaust gas. The PM filter includes M zones, wherein M is an integer greater than one. The electric heater includes M segments corresponding to the M zones that heat exhaust gas input to selected ones of the M zones when activated. The first heating module activates N of the M segments to heat exhaust gas input to N of the M zones to regenerate the N zones, wherein N is an integer less than M. The second heating module operates in one of a first mode and a second mode to regenerate other ones of the M zones after the N zones are regenerated. The first mode includes adjusting an air-fuel ratio of the exhaust gas to heat exhaust gas input to the M zones. The second mode includes activating other ones of the M segments to heat exhaust gas input to other ones of the M zones.

In other features, the second heating module operates in the first mode when a flow rate of the exhaust gas is greater than a predetermined flow rate. In still other features, the second heating module operates in the second mode when the flow rate is less than or equal to the predetermined flow rate. In yet other features, the first mode includes heating the exhaust gas to a predetermined temperature. The predetermined temperature causes PM in the other ones of the M zones to combust. In other features, the predetermined temperature is greater than 650° C. In still other features, the predetermined temperature is greater than 700° C.

In yet other features, the first mode includes adjusting the air-fuel ratio by injecting fuel into at least one of a cylinder of an engine and an exhaust system. The first heating module activates the N segments until PM in the N zones combusts. In still other features, the N zones include an axially centered portion of the PM filter, and the others of the M zones include portions of the PM filter surrounding the N zones.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
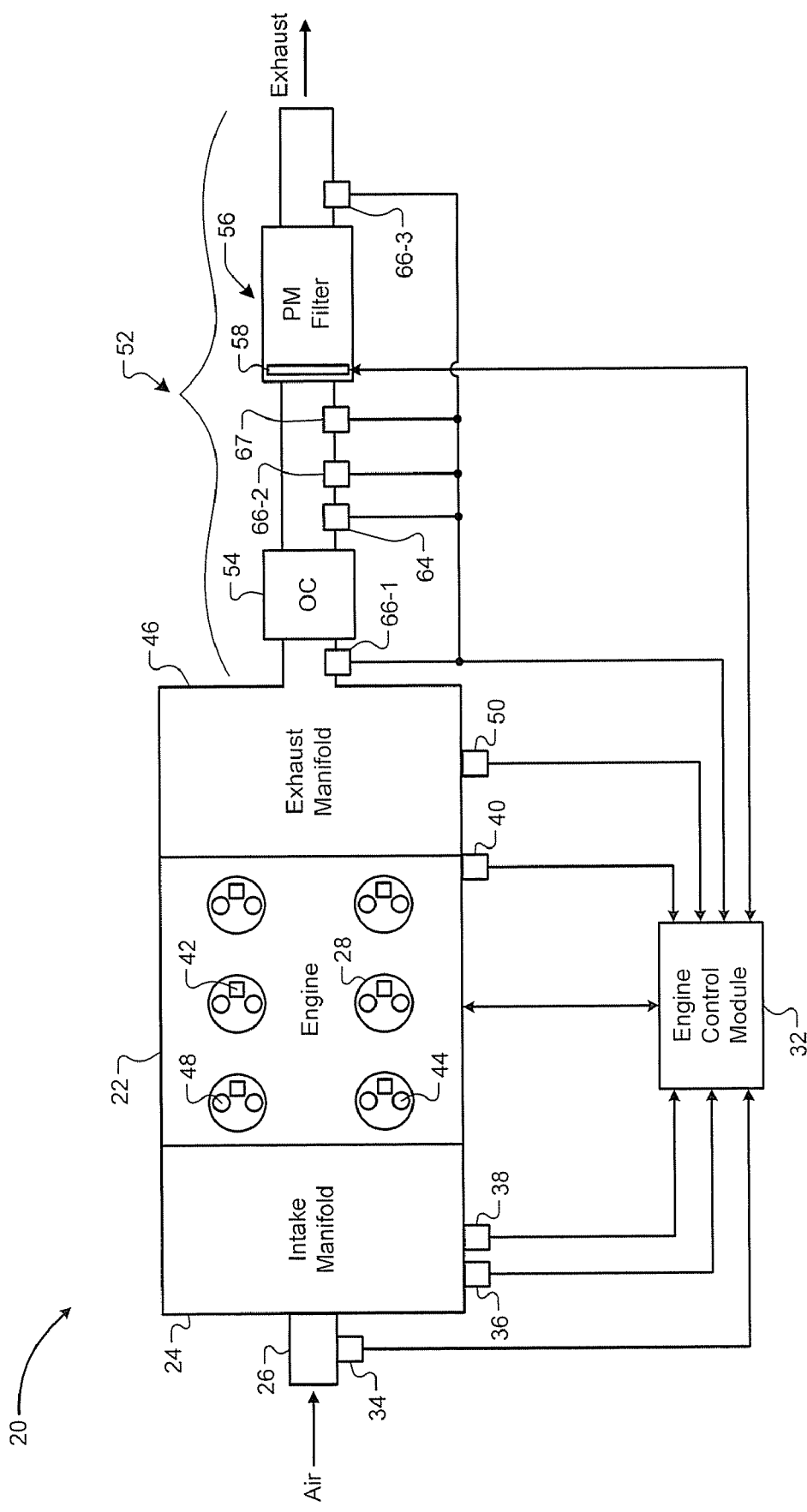
FIG. 1 is a functional block diagram of an exemplary engine system according to the principles of the present disclosure.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

When the PM filter is full of particulates, the exhaust heating technique may be limited to an exhaust temperature that permits slow, controlled burning of the PM. For example only, if the PM burns too quickly, thermal stresses inside the PM filter may damage the PM filter. Thermal stress may occur due to rapid and/or uneven heating that causes increased expansion in some portions of the PM filter. Therefore, the exhaust temperature is controlled to be less than a thermal stress temperature, such as approximately 650° C.

The present disclosure uses an electrical heating technique to reduce the thermal stress inside the PM filter associated with exhaust temperatures greater than the thermal stress temperature. A first one of a plurality of portions of the PM filter is regenerated using the electrical heating technique and remaining ones of the plurality of portions are regenerated using one of the electrical heating technique and a high temperature exhaust heating technique of the present disclosure. By regenerating a first portion using the electrical heating technique, thermal stress due to expansion of the first portion is reduced when using the high temperature exhaust heating technique of the present disclosure.

The first portion may be a center portion that is approximately centered on an axis of the PM filter parallel to the exhaust gas flow direction. The remaining plurality of portions may be arranged at radial distances from the axis (i.e., surrounding the first portion). An inlet of the PM filter includes a plurality of zones that correspond to the plurality of portions. A first zone may be an area of the inlet corresponding to the first portion, and remaining ones of the plurality of zones may be areas surrounding the first zone that correspond to the remaining plurality of portions.

An electric heater covers the inlet and includes a plurality of segments that correspond to the plurality of zones. A first segment of the electric heater heats the first zone and causes a PM combustion wave to travel down channels of the first portion to regenerate the first portion of the PM filter. The electric heater may heat the exhaust gas input to the first zone to a first temperature to initiate regeneration of the first portion. For example only, the electric heater may heat the exhaust gas input to the first zone to a temperature that is greater than approximately 650° C.

The remaining portions may be regenerated more quickly using the high temperature exhaust heating technique of the present disclosure after the first portion is regenerated. For example only, the exhaust heating technique of the present disclosure heats the exhaust gas to temperatures greater than 650° C. The amount of time required to regenerate the remaining portions may be significantly reduced at temperatures greater than 650° C. The remaining portions may be regenerated more quickly using exhaust temperatures that are greater than the thermal stress temperature.

The exhaust heating technique may be operation limited based on exhaust gas flow rate. As exhaust gas flow decreases, for example, below a predetermined flow rate (kg/s), the PM filter temperature may not be properly controlled. In addition, less exhaust gas flow is available to absorb the heat released by PM combustion causing the PM filter temperature to increase.

The electrical heating technique may also be operation limited based on exhaust gas flow rate. As exhaust gas flow increases, for example, above a predetermined flow rate (kg/s), the ability to initiate regeneration using an electrically heated element decreases. Therefore, the present disclosure regenerates the remaining portions of the PM filter using one of the electrical heating technique and the exhaust heating technique based on the exhaust gas flow rate.

Referring now to FIG. 1, an exemplary engine system 20 is schematically illustrated in accordance with the present disclosure. The engine system 20 is merely exemplary in nature. The electrically heated particulate matter (PM) filter described herein may be implemented in various engine systems using a particulate filter. Such engine systems may include, but are not limited to, diesel engine systems, gasoline direct injection engine systems, and homogeneous charge compression ignition engine systems.

The engine system 20 includes an engine 22 that combusts an air/fuel mixture to produce drive torque. Air is drawn into an intake manifold 24 through an inlet 26. A throttle (not shown) may be included to regulate air flow into the intake manifold 24. Air within the intake manifold 24 is distributed into cylinders 28. Although FIG. 1 depicts six cylinders 28, the engine 22 may include additional or fewer cylinders 28. For example, engines having 4, 5, 8, 10, 12, and 16 cylinders are contemplated.

An engine control module (ECM) 32 communicates with components of the engine system 20. The components may include the engine 22, sensors, and actuators as discussed herein. The ECM 32 may implement control of the electrically heated particulate filter of the present disclosure.

Air passes through the inlet 26 through a mass airflow (MAF) sensor 34. The MAF sensor 34 generates a MAF signal that indicates a rate of air flowing through the MAF sensor 34. A manifold pressure (MAP) sensor 36 is positioned in the intake manifold 24 between the inlet 26 and the engine 22. The MAP sensor 36 generates a MAP signal that indicates air pressure in the intake manifold 24. An intake air temperature (IAT) sensor 38 located in the intake manifold 24 generates an IAT signal based on intake air temperature.

An engine crankshaft (not shown) rotates at engine speed or a rate that is proportional to engine speed. A crankshaft sensor 40 senses a position of the crankshaft and generates a crankshaft position (CSP) signal. The CSP signal may be related to the rotational speed of the crankshaft and cylinder events. For example only, the crankshaft sensor 40 may be a variable reluctance sensor. The engine speed and cylinder events may be sensed using other suitable methods.

The ECM 32 actuates fuel injectors 42 to inject fuel into the cylinders 28. An intake valve 44 selectively opens and closes to enable air to enter the cylinder 28. An intake camshaft (not shown) regulates the intake valve position. A piston (not shown) compresses and combusts the air/fuel mixture within the cylinder 28. The piston drives the crankshaft during a power stroke to produce drive torque. Exhaust gas resulting from the combustion within the cylinder 28 is forced out through an exhaust manifold 46 when an exhaust valve 48 is in an open position. An exhaust camshaft (not shown) regulates the exhaust valve position. An exhaust manifold pressure (EMP) sensor 50 generates an EMP signal that indicates exhaust manifold pressure.

An exhaust treatment system 52 may treat the exhaust gas. The exhaust treatment system 52 may include an oxidation catalyst (OC) 54. The OC 54 oxidizes carbon monoxide and hydrocarbons in the exhaust gas. The OC 54 oxidizes the exhaust gas based on the post combustion air/fuel ratio. The amount of oxidation may increase the temperature of the exhaust gas.

The exhaust treatment system 52 includes a particulate matter (PM) filter assembly 56. The PM filter assembly 56 may receive exhaust gas from the OC 54 and filter any particulate matter present in the exhaust. An electric heater 58 selectively heats the exhaust and/or a portion of the PM filter assembly 56 to initiate regeneration of the PM. The ECM 32 controls the engine 22 and filter regeneration based on various sensed and/or estimated information.

More specifically, the ECM 32 may estimate a PM filter load based on the sensed and estimated information. The filter load may correspond to an amount of particulate matter in the PM filter assembly 56. The filter load may be based on an exhaust temperature and/or the exhaust flow. Exhaust flow may be based on the MAF signal and fueling of the engine 22. When the filter load is greater than or equal to a filter load threshold, regeneration may be initiated by the ECM 32.

The exhaust treatment system 52 may include a gas sensor 64 and exhaust temperature sensors 66-1, 66-2, 66-3 (collectively exhaust temperature sensors 66). The gas sensor 64 generates a gas level signal that indicates amounts of NOx and/or oxygen in the exhaust gas.

The exhaust temperature sensors 66 generate exhaust temperature signals that indicate temperatures of the exhaust gas. The exhaust temperature sensors 66 may measure temperatures of the exhaust gas before the OC 54 and the PM filter assembly 56. The exhaust temperature sensors 66 may measure temperatures of the exhaust gas after the PM filter assembly 56 and/or between the OC 54 and the PM filter assembly 56. For example only, exhaust temperature sensor 66-2 may measure an inlet exhaust gas temperature of the PM filter assembly 56. The ECM 32 may generate an exhaust temperature model to estimate exhaust temperatures throughout the exhaust treatment system 52.

An exhaust flow rate sensor 67 may generate a flow rate signal that indicates a flow rate of the exhaust gas into the PM filter assembly 56. The ECM 32 may also generate an exhaust flow rate model to estimate the exhaust flow rate based on fueling, MAF, and other engine conditions.

Figure 2:
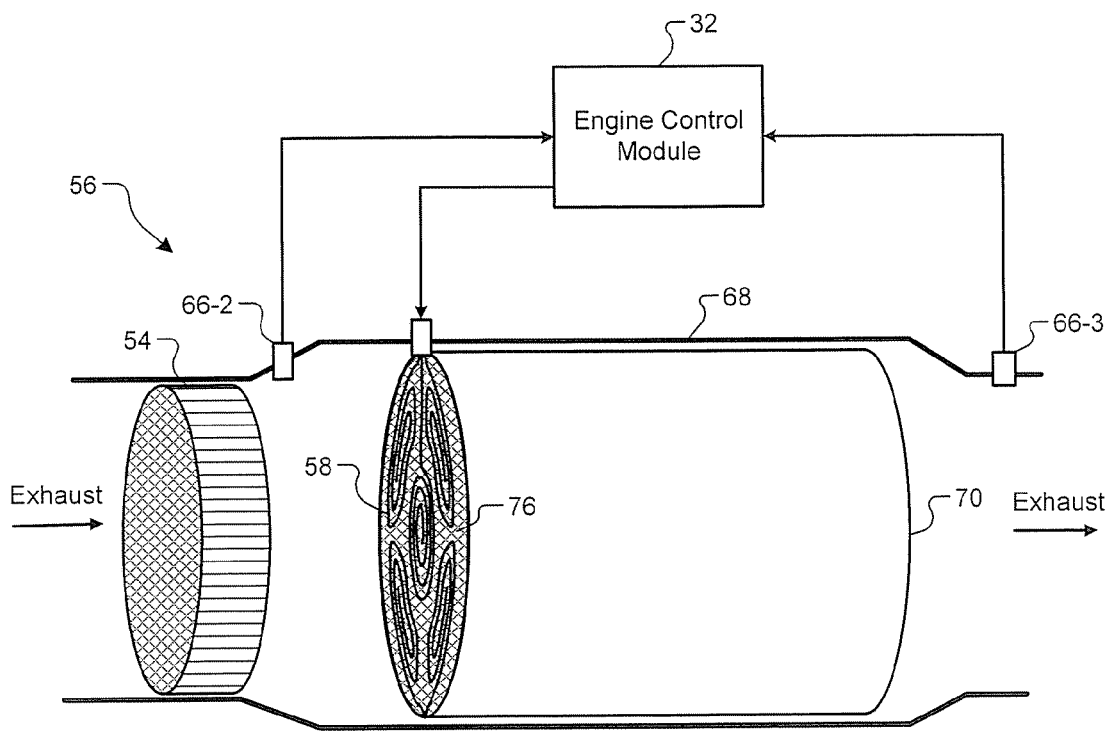
FIG. 2 illustrates an exemplary electrically heated particulate filter according to the principles of the present disclosure.
Figure 4:
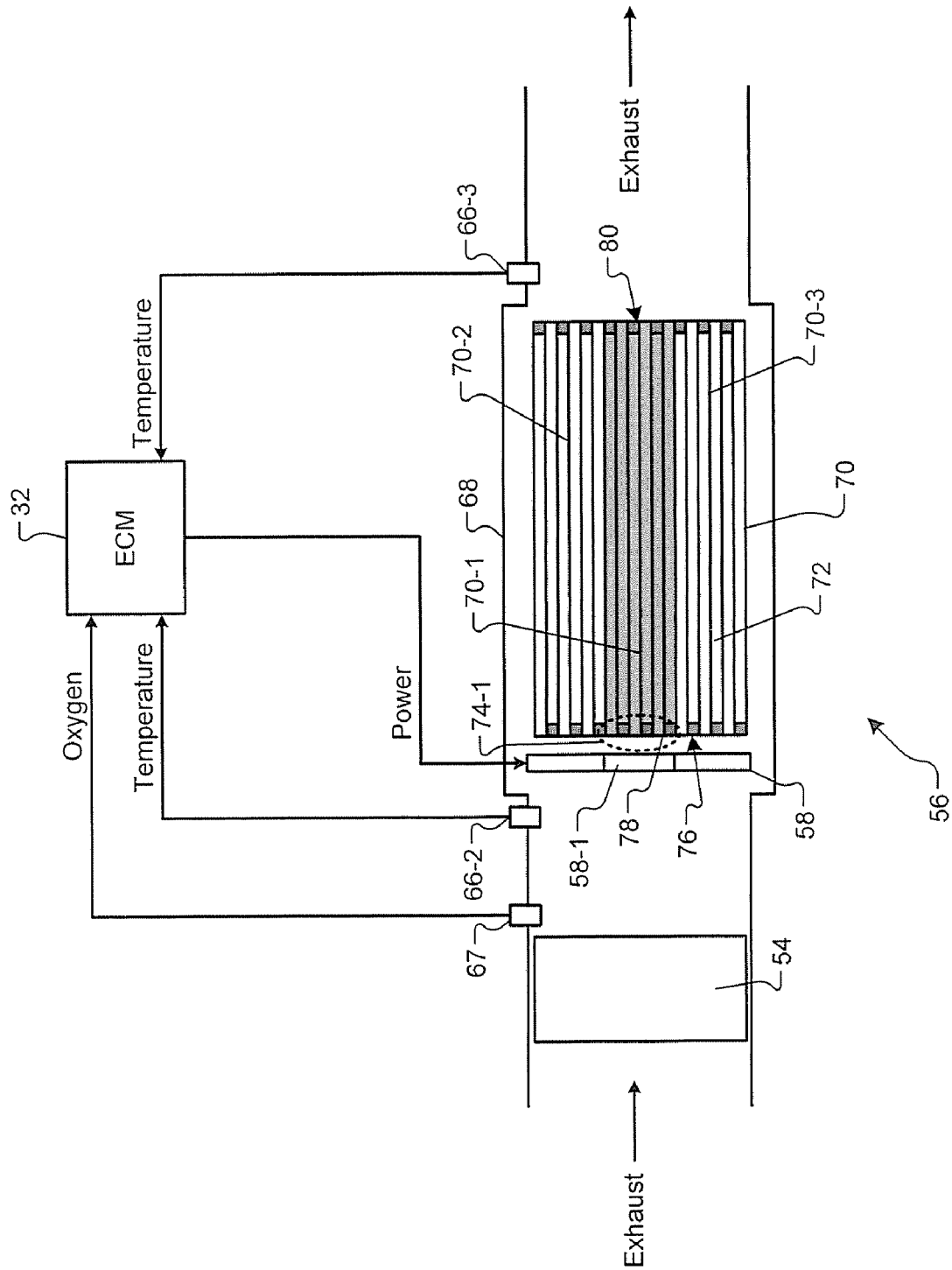
FIG. 4 illustrates regeneration of the exemplary electrically heated particulate filter according to the principles of the present disclosure.

Referring now to FIGS. 2 and 4, an exemplary PM filter assembly 56 is shown. The PM filter assembly 56 may include a housing 68, a PM filter 70, and the electric heater 58. The electric heater 58 may be arranged between the OC 54 and the PM filter 70. The ECM 32 may apply energy or power to the electric heater 58 in the form of voltage or current. The PM filter 70 includes channels 72 through which exhaust gas may flow. PM may be filtered as the exhaust gas passes through the channels 72, leaving PM inside the channels 72.

Figure 3:
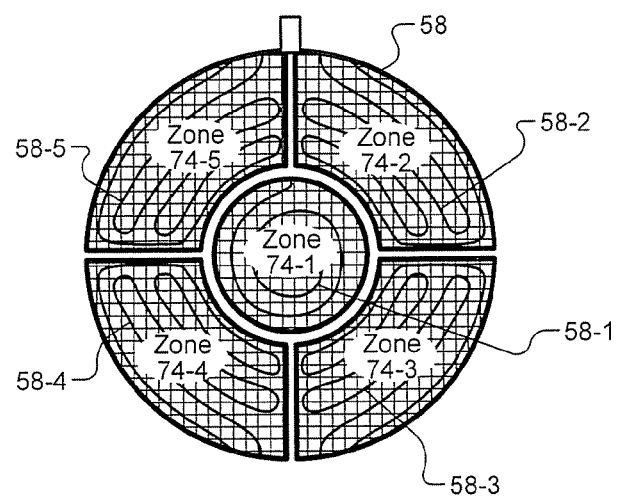
FIG. 3 illustrates an inlet of the exemplary electrically heated particulate filter including a plurality of electric heaters according to the principles of the present disclosure.

Referring to FIGS. 2, 3 and 4, the electric heater 58 may comprise one or more coils, heater segments, or conductive elements that cover a plurality of zones of the PM filter 70. A first zone 74-1 may be a center zone that includes an axially centered area of an inlet 76 of the PM filter 70. Remaining zones 74-2, 74-3, 74-4, and 74-5 may surround the first zone 74-1 of the PM filter 70. Each zone may be an area of the PM filter 70 in contact with the electric heater 58. Each zone may include a portion of the PM filter 70 downstream of the electric heater 58.

Regeneration may be initiated in one or more zones by activating one or more segments 58-1, 58-2, 58-3, 58-4, and 58-5 of the electric heater 58 corresponding to each zone. The electric heater 58 may be activated until a temperature of the zone is greater than or equal to the PM combustion temperature. For example only, PM may combust at a temperature of approximately 600° C.

Referring now to FIG. 4, the ECM 32 initiates regeneration in the first zone 74-1 when the filter load value is greater than the filter load threshold. Exhaust gas enters the PM filter 70 from the electric heater 58 through the inlet 76. The ECM 32 may supply power to the electric heater 58 to heat a first segment 58-1 of the heater corresponding to the first zone 74-1. Power may be supplied to the electric heater 58 until the first zone temperature is greater than or equal to the PM combustion temperature. The electric heater 58 may be activated for a predetermined time based on the heater temperature and the inlet exhaust gas temperature measured by sensor 66-2.

The electric heater 58 heats the exhaust gas passing through the first segment 58-1 of the electric heater 58 to heat the first zone 74-1. The electric heater 58 may also directly heat the first zone 74-1. When the temperature of the first zone 74-1 is greater than or equal to the PM combustion temperature, PM near the first zone 74-1 ignites and initiates regeneration. For example only, PM may begin to combust behind end plugs 78 in the first zone 74-1.

Regeneration continues through a first filter portion 70-1 corresponding to the first zone 74-1 as the exhaust gas flow advances combusting PM through the first filter portion 70-1. The first filter portion 70-1 may include one or more channels 72 extending from the first zone 74-1 to a PM filter outlet 80. The PM filter 70 may include a plurality of filter portions 70-2, 70-3, 70-4 (not shown), and 70-5 (not shown) corresponding to each of the other zones 74-2, 74-3, 74-4, and 74-5 respectively.

When the first filter portion 70-1 completes regeneration, the ECM 32 determines whether to heat the remaining zones using additional segments of the electric heater 58 or using an exhaust heating technique based on the exhaust gas flow rate. When the exhaust gas flow rate is less than or equal to a predetermined flow rate (i.e., threshold flow rate), the ECM 32 may activate one or more segments of the electric heater 58 corresponding to one or more other zones of the PM filter 70, such as zone 74-2. The ECM 32 may regenerate one or more other portions using the electrical heating technique.

When the exhaust gas flow rate is greater than the predetermined flow rate, the ECM 32 may increase the exhaust gas temperature using the exhaust heating technique. The exhaust heating technique may include adjusting the exhaust gas temperature to regenerate the other filter portions 70-2, 70-3, 70-4, and 70-5 of the PM filter 70 at the same time. The ECM 32 may increase the exhaust gas temperature by adjusting fuel entering the engine 22 and/or exhaust treatment system 52. For example only, post-fuel injection may inject fuel into the cylinders 28 and/or the exhaust treatment system 52 using fuel injectors 42. The fuel may be burned using a fuel burner (not shown) and/or a catalytic oxidizer such as the OC 54 to increase the exhaust temperature.

The ECM 32 may increase the exhaust gas temperature to a second temperature that is greater than the PM combustion temperature for a predetermined time. The second temperature may be greater than a temperature that may cause thermal stress to the PM filter 70 when the first filter portion 70-1 is full of PM. For example only, the second temperature may be greater than approximately 650° C.

Because the first filter portion 70-1 has been regenerated, little or no expansion of the first filter portion 70-1 may occur as heated exhaust gas flows there through. PM in the first filter portion 70-1 has been removed and no heat is released from PM combustion in the first filter portion 70-1. Therefore, thermal stresses on the filter portions 70-2, 70-3, 70-4, and 70-5 due to expansion of the first filter portion 70-1 may be reduced. Heating the exhaust gas to the second temperature regenerates the remaining filter portions at a faster rate than when the inlet exhaust gas temperature is less than the second temperature.

Figure 5:
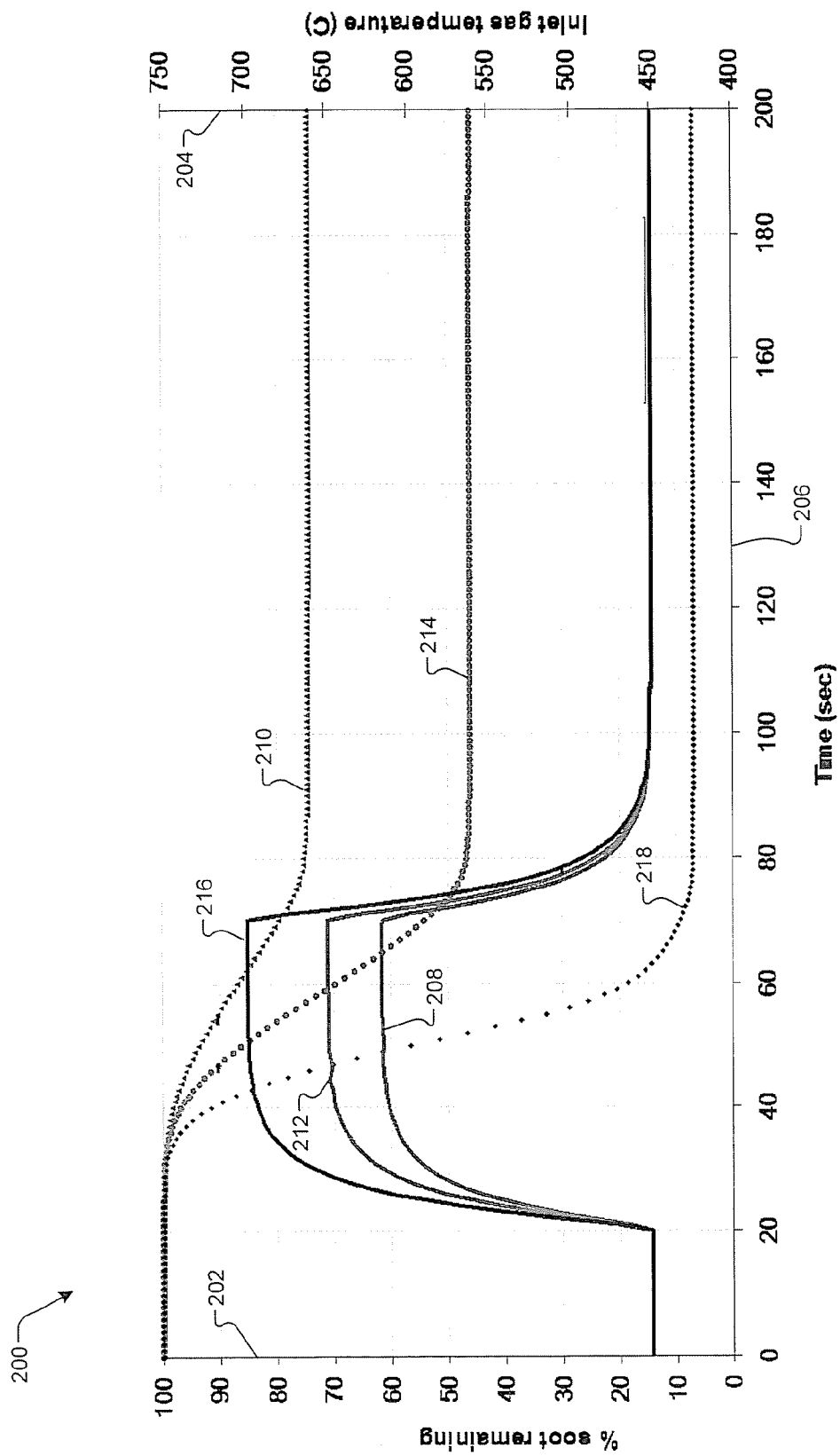
FIG. 5 is a graph illustrating the effect of various exhaust gas temperatures on regeneration of the exemplary electrically heated particulate filter.

Referring now to FIG. 5, a graph 200 illustrates the effect of various inlet exhaust gas temperatures on regeneration times. The graph 200 includes a first y-axis 202 representing a percentage of soot (i.e., PM) remaining in the PM filter 70. The percentage of soot may correspond to the filter load. A second y-axis 204 represents the inlet exhaust gas temperature in degrees Celsius (° C.). An x-axis 206 represents time in seconds.

Plot 208 illustrates an inlet exhaust gas temperature that increases from approximately 450° C. to approximately 615° C. Plot 210 corresponds to the inlet exhaust gas temperature of plot 208 and illustrates the percentage of soot remaining in the PM filter as time progresses. The inlet exhaust gas temperature is approximately 615° C. during a 30-second period from 40 seconds to 70 seconds. During the 30-second period, the percentage of soot decreases by approximately 20%.

Plot 212 illustrates an inlet exhaust gas temperature that increases from approximately 450° C. to approximately 650° C. Plot 214 corresponds to the inlet exhaust gas temperature of plot 212 and illustrates the percentage of soot remaining in the PM filter as time progresses. The inlet exhaust gas temperature is approximately 650° C. during a 30-second period from 40 seconds to 70 seconds. During the 30-second period, the percentage of soot decreases by approximately 50%.

Plot 216 illustrates an inlet exhaust gas temperature that increases from approximately 450° C. to approximately 700° C. Plot 218 corresponds to the inlet exhaust gas temperature of plot 216 and illustrates the percentage of soot remaining in the PM filter as time progresses. The inlet exhaust gas temperature is approximately 700° C. during a 30-second period from 40 seconds to 70 seconds. During the 30-second period, the percentage of soot decreases by approximately 90%.

As shown in graph 200, the higher the inlet exhaust gas temperature, the faster regeneration of the PM filter 70 may be performed. When the PM filter 70 is full of PM, inlet exhaust gas temperatures greater than approximately 650° C. cause rapid expansion of the PM filter 70 and thermal stress that may damage the PM filter 70. Therefore, the present disclosure electrically heats the first filter portion 70-1 of the PM filter 70 to decrease the amount of PM in the first portion before heating the exhaust gas to a temperature greater than approximately 650° C.

Figure 6:
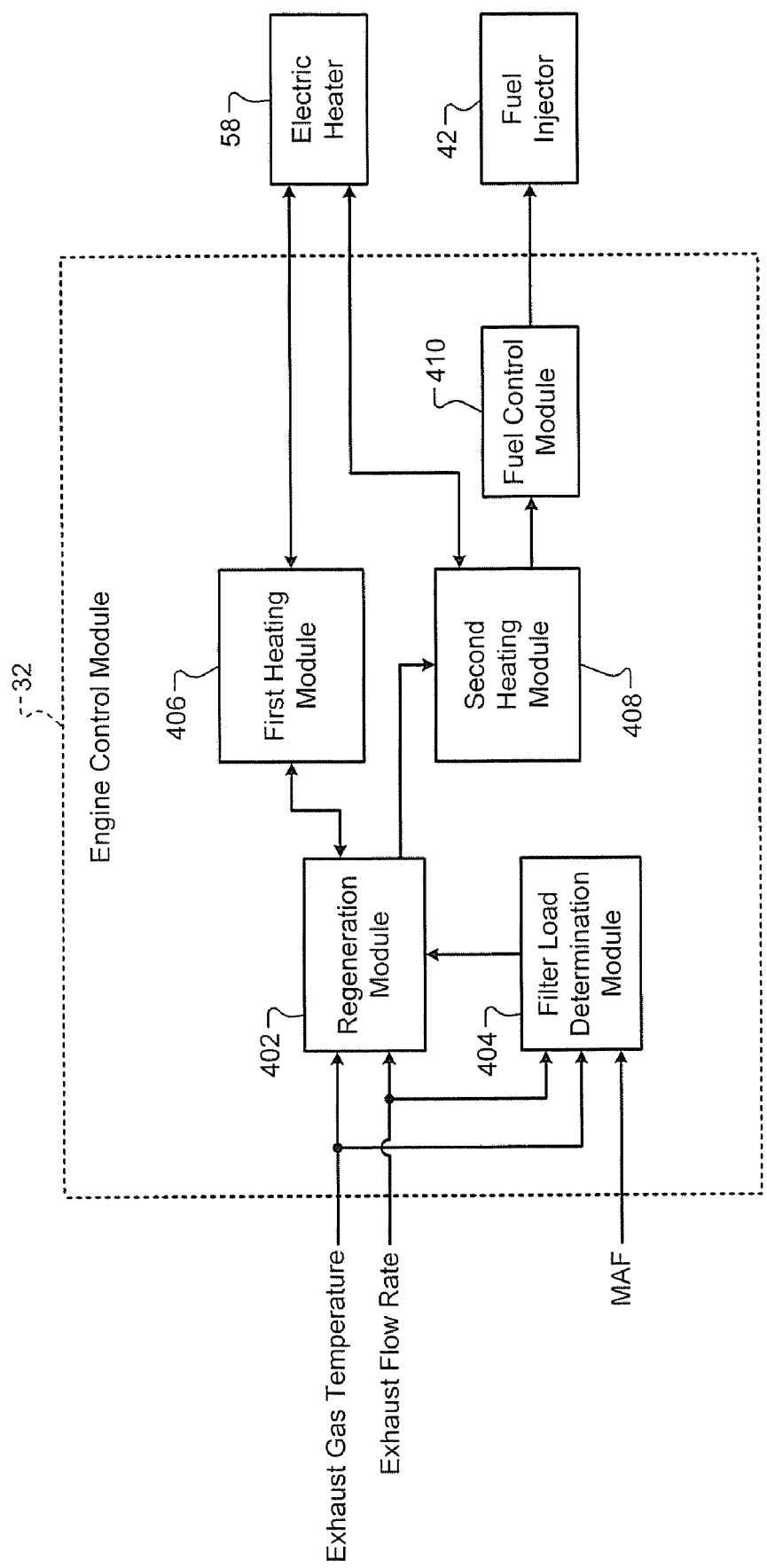
FIG. 6 is a functional block diagram of an exemplary engine control module according to the principles of the present disclosure.

Referring now to FIG. 6, a functional block diagram of an exemplary ECM 32 is presented. The ECM 32 may include a regeneration module 402 that determines when the filter load is greater than the filter load threshold. A filter load determination module 404 may determine the filter load based on the MAF, exhaust temperatures, and/or exhaust gas flow rate. When the filter load is greater than the filter load threshold, the regeneration module 402 may begin regeneration of the PM filter 70.

The regeneration module 402 may activate a first heating module 406 to begin regeneration. The first heating module activates the electric heater 58 to heat the first zone 74-1 of the PM filter 70. The first heating module 406 activates the electric heater 58 to heat the exhaust gas to a first temperature until the temperature of the first zone 74-1 is greater than or equal to the PM combustion temperature. For example only, the first temperature may be greater than approximately 650° C. PM in the first zone 74-1 begins to combust. Exhaust gas flow advances the combusting PM through the first filter portion 70-1 of the PM filter 70, and the first filter portion 70-1 completes regeneration.

After regeneration of the first filter portion 70-1 completes, the regeneration module 402 may determine whether to regenerate the remaining filter portions 70-2, 70-3, 70-4, and 70-5 using the electric heater 58 based on the exhaust gas flow rate. When the exhaust gas flow rate is less than or equal to a predetermined flow rate, the regeneration module 402 may determine to regenerate the remaining portions using electrical heating in the same manner as the first filter portion 70-1. A second heating module 408 may activate one or more segments of the electric heater 58 to regenerate one or more of the remaining portions of the PM filter 70.

When the exhaust gas flow rate is greater than the predetermined flow rate, the regeneration module 402 may determine to regenerate the remaining portions using exhaust heating. The second heating module 408 may control the exhaust gas temperature by adjusting fuel injection of the engine system 20. For example only, the second heating module 408 may adjust fueling by a fuel control module 410 to increase the inlet exhaust gas temperature to a second temperature when regeneration of the first filter portion 70-1 is complete. The fuel control module 410 may adjust the amount of fuel injected by fuel injectors 42 and/or timing of the fuel injections. The second temperature may be greater than the thermal stress temperature that causes thermal stress when the PM filter 70 is full of PM. For example only, the second temperature may be greater than approximately 650° C.

Figure 7:
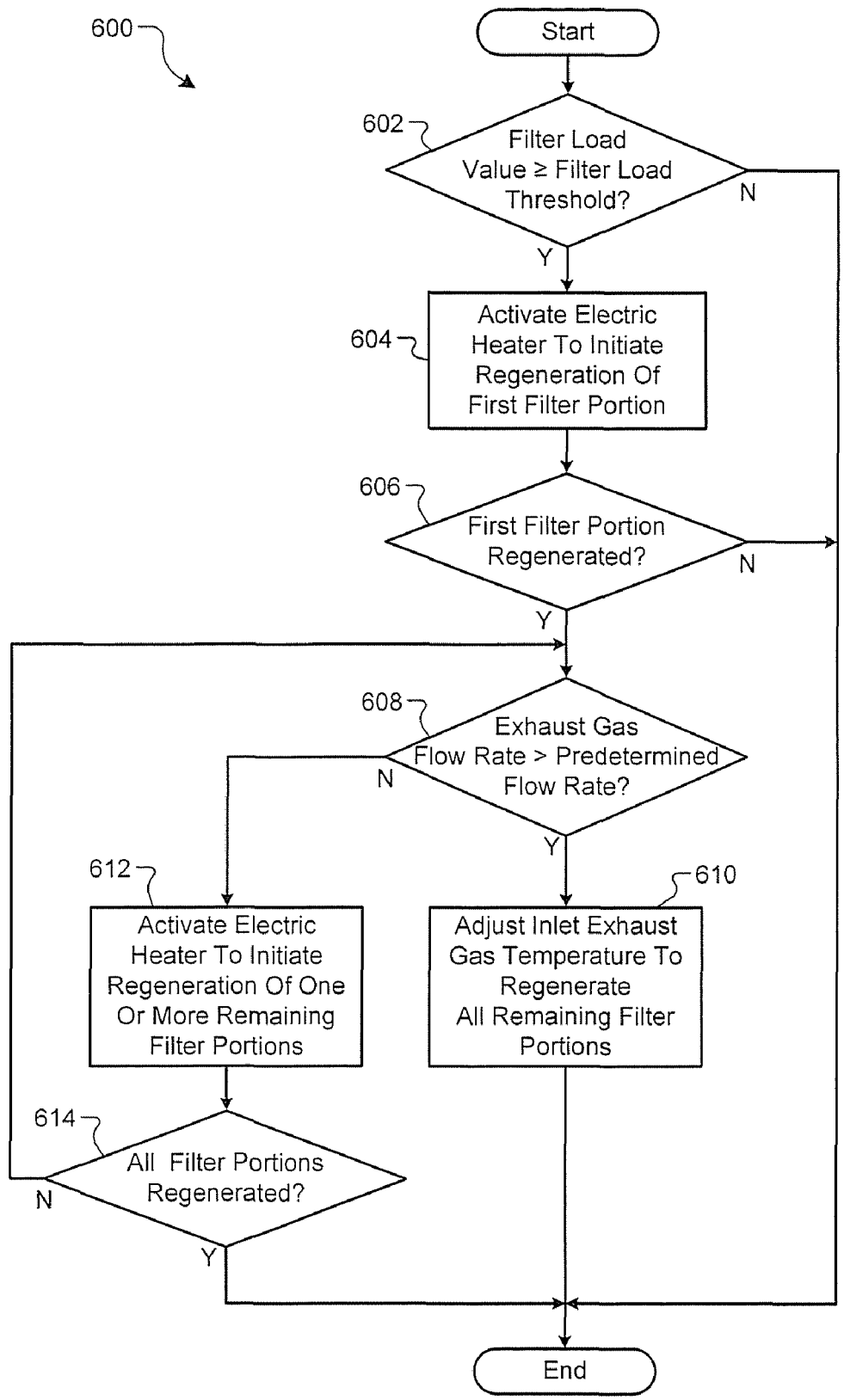
FIG. 7 is a flowchart depicting an exemplary method performed in the engine control module.

Referring now to FIG. 7, a flowchart 600 depicts a method performed by the ECM 32 according to the principles of the present disclosure. Control begins in step 602 when control determines whether the filter load is greater than the filter load threshold. When the filter load is greater than or equal to the filter load threshold, control activates the electric heater 58 to initiate regeneration of the first filter portion 70-1 in step 604. The electric heater 58 heats the exhaust gas input to the first filter portion 70-1 to the first temperature.

In step 606, control determines whether the first filter portion 70-1 completed regeneration. For example only, control may determine whether regeneration completes based on a predetermined period. Control may determine whether regeneration completes based on exhaust temperatures such as the outlet exhaust gas temperature. When the first filter portion 70-1 is regenerated, control continues to step 608. Otherwise, control ends.

In step 608, control determines whether the exhaust gas flow rate is greater than a predetermined flow rate. When the exhaust gas flow rate is greater than the predetermined flow rate, control continues to step 610. Otherwise, control proceeds to step 612.

In step 610, control adjusts the inlet exhaust gas temperature to regenerate the remaining portions of the PM filter 70 at the same time. When the exhaust gas flow rate is greater than the predetermined flow rate, a sufficient amount of exhaust gas is available to control the temperature of the remaining portions of the PM filter 70 during regeneration. Control may increase the exhaust gas temperature to the second temperature by adjusting the air-fuel ratio of the exhaust gas stream. Once the remaining portions have been regenerated, control ends.

When the exhaust gas flow rate is less than or equal to the predetermined flow rate, control may activate the electric heater 58 to initiate regeneration of one or more remaining filter portions in step 612. In step 614, control determines whether all of the remaining filter portions have been regenerated. When less than all of the remaining filter portions have been regenerated, control returns to step 608. Control may determine whether to regenerate the remaining filter portions using electric heating or exhaust heating based on the exhaust gas flow rate. Otherwise, control ends when all remaining filter portions have been regenerated.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. A control system comprising
   a particulate matter (PM) filter that receives exhaust gas of an engine and filters PM from the exhaust gas, wherein the PM filter includes M zones and wherein M is an integer greater than one;
   an electric heater that includes M segments corresponding to the M zones that heat exhaust gas input to selected ones of the M zones when activated;
   a first heating module that activates N of the M segments to heat exhaust gas input to N of the M zones to regenerate the N zones, wherein N is an integer less than M; and
   a second heating module that is configured to operate in a first mode and a second mode to regenerate other ones of the M zones after the N zones are regenerated,
   wherein the first mode includes adjusting an air-fuel ratio of the exhaust gas to heat exhaust gas input to the M zones, and wherein the second mode includes activating other ones of the M segments to heat exhaust gas input to other ones of the M zones.

2. The control system of claim 1, wherein the second heating module operates in the first mode when a flow rate of the exhaust gas is greater than a predetermined flow rate.

3. The control system of claim 2, wherein the second heating module operates in the second mode when the flow rate is less than or equal to the predetermined flow rate.

4. The control system of claim 1, wherein the first mode includes heating the exhaust gas to a predetermined temperature.

5. The control system of claim 4, wherein the predetermined temperature causes PM in the other ones of the M zones to combust.

6. The control system of claim 4, wherein the predetermined temperature is greater than 650° C.

7. The control system of claim 4, wherein the predetermined temperature is greater than 700° C.

8. The control system of claim 1, wherein the first mode includes adjusting the air-fuel ratio by injecting fuel into at least one of a cylinder of an engine and an exhaust system.

9. The control system of claim 1, wherein the first heating module activates the N segments until PM in the N zones combusts.

10. The control system of claim 1, wherein the N zones include an axially centered portion of the PM filter, and wherein the others of the M zones include portions of the PM filter surrounding the N zones.

11. A method comprising:
    providing a particulate matter (PM) filter that receives exhaust gas of an engine and filters PM from the exhaust gas, wherein the PM filter includes M zones and wherein M is an integer greater than one;
    providing an electric heater that includes M segments corresponding to the M zones that heat exhaust gas input to selected ones of the M zones when activated;
    activating N of the M segments to heat exhaust gas input to N of the M zones to regenerate the N zones, wherein N is an integer less than M; and
    operating in a first mode and a second mode to regenerate other ones of the M zones after the N zones are regenerated,
    wherein the first mode includes adjusting an air-fuel ratio of the exhaust gas to heat exhaust gas input to the M zones, and wherein the second mode includes activating other ones of the M segments to heat exhaust gas input to other ones of the M zones.

12. The method of claim 11, further comprising operating in the first mode when a flow rate of the exhaust gas is greater than a predetermined flow rate.

13. The method of claim 12, further comprising operating in the second mode when the flow rate is less than or equal to the predetermined flow rate.

14. The method of claim 11, wherein operating in the first mode includes heating the exhaust gas to a predetermined temperature.

15. The method of claim 14, wherein the predetermined temperature causes PM in the other ones of the M zones to combust.

16. The method of claim 14, wherein the predetermined temperature is greater than 650° C.

17. The method of claim 14, wherein the predetermined temperature is greater than 700° C.

18. The method of claim 11, wherein operating in the first mode includes adjusting the air-fuel ratio by injecting fuel into at least one of a cylinder of an engine and an exhaust system.

19. The method of claim 11, further comprising activating the N segments until PM in the N zones combusts.

20. The method of claim 11, wherein the N zones include an axially centered portion of the PM filter, and wherein the others of the M zones include portions of the PM filter surrounding the N zones.

* * * * *